(12) United States Patent
Arai

(10) Patent No.: US 7,449,540 B2
(45) Date of Patent: Nov. 11, 2008

(54) CURABLE SILICONE COMPOSITION

(75) Inventor: Masatoshi Arai, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 120 days.

(21) Appl. No.: 11/519,088

(22) Filed: Sep. 12, 2006

(65) Prior Publication Data

US 2007/0073025 A1 Mar. 29, 2007

(30) Foreign Application Priority Data

Sep. 13, 2005 (JP) ............................. 2005-266077

(51) Int. Cl.
 C08G 77/00 (2006.01)
 C08G 77/12 (2006.01)
 C08G 77/20 (2006.01)
 C08G 77/04 (2006.01)
(52) U.S. Cl. ............................. 528/40; 528/31; 528/32; 528/37
(58) Field of Classification Search .................. 528/15
See application file for complete search history.

(56) References Cited

U.S. PATENT DOCUMENTS

| | | | | |
|---|---|---|---|---|
| 4,877,820 A * | 10/1989 | Cowan | ........................ | 523/222 |
| 4,883,569 A * | 11/1989 | Endo et al. | ............. | 204/157.74 |
| 5,008,360 A * | 4/1991 | Bard et al. | ..................... | 528/25 |
| 5,013,809 A * | 5/1991 | Leibfried, Sr. | .............. | 524/862 |
| 5,025,048 A * | 6/1991 | Burnier | ........................ | 524/99 |
| 5,034,490 A * | 7/1991 | Jacobine et al. | ............... | 528/30 |
| 5,124,423 A * | 6/1992 | Leibfried | ..................... | 528/15 |
| 5,147,945 A * | 9/1992 | Woodside et al. | ............ | 525/475 |
| 5,171,816 A * | 12/1992 | Jacobine et al. | ............... | 528/15 |
| 5,412,055 A * | 5/1995 | Loo | ............................. | 528/15 |
| 6,903,171 B2 * | 6/2005 | Rhodes et al. | ............... | 526/171 |
| 2005/0080154 A1 * | 4/2005 | Tabei | ........................ | 522/148 |

FOREIGN PATENT DOCUMENTS

| | | |
|---|---|---|
| DE | 41 28 932 A1 | 3/1993 |
| DE | 41 28 932 A1 * | 4/1993 |
| JP | 2003-252881 | 9/2003 |
| WO | WO-02/062859 A2 | 8/2002 |

OTHER PUBLICATIONS

Journal of Inorganic and Organometallic Polymers, vol. 9, No. 3, 1999, pp. 151-164.

* cited by examiner

*Primary Examiner*—Randy Gulakowski
*Assistant Examiner*—Robert Loewe
(74) *Attorney, Agent, or Firm*—Birch, Stewart, Kolasch & Birch, LLP

(57) ABSTRACT

A composition comprising
(A) polycycloolefin-functional polysiloxane represented by the following average compositional formula (1)

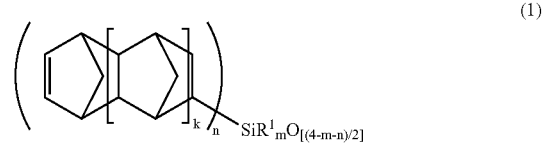

(1)

Figure 1:
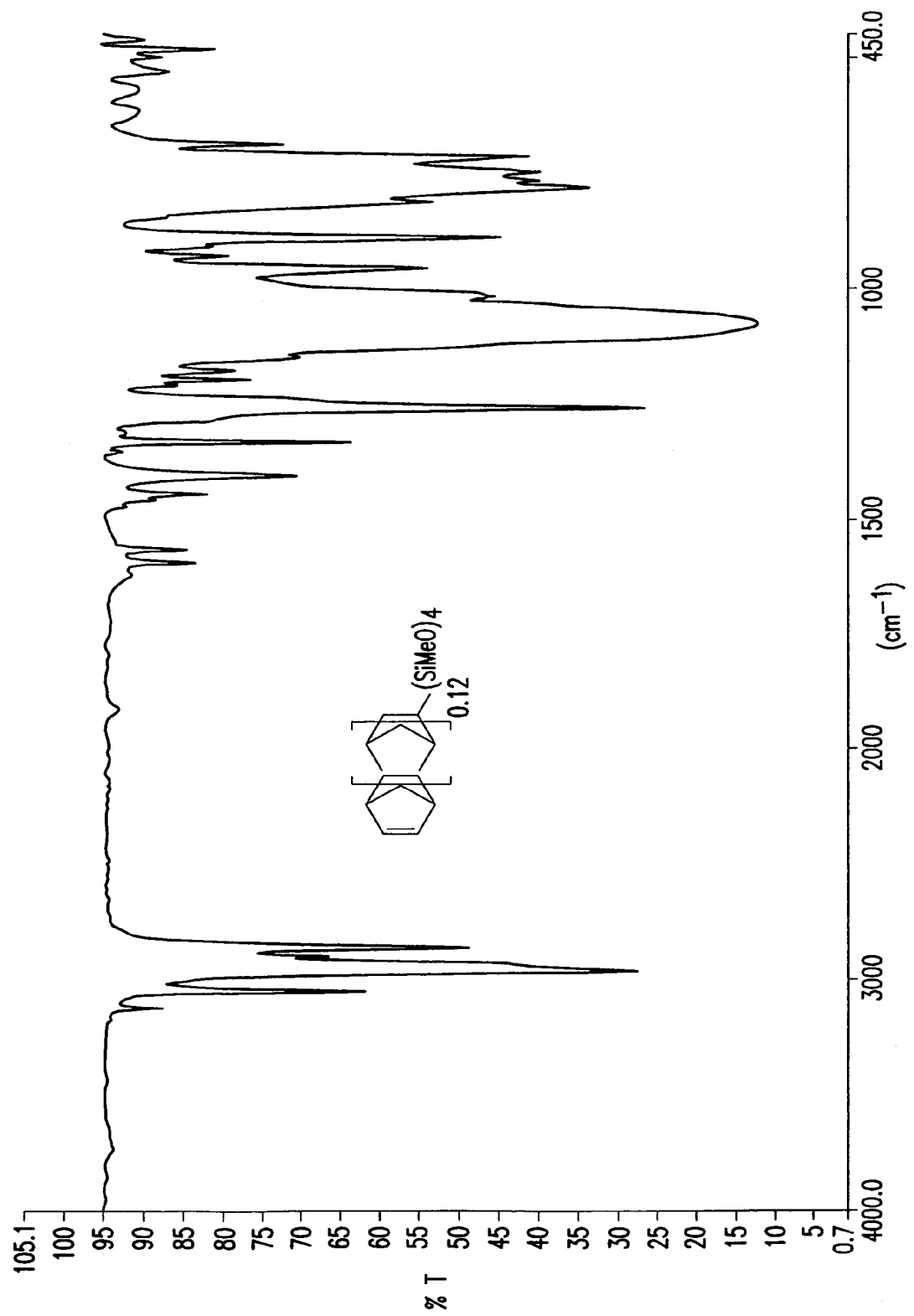

wherein $R^1$ is a monovalent organic group which does not have an unsaturated bond and may be different from each other, k is the number of 0 or larger, n is the number of from 0.01 to less than 4, m is the number of from 0 to less than 4, provided that the sum of m and n is larger than 0 and less than 4, (B) a siloxane having an SiH bond represented by the following average compositional formula (2) in such an amount that a molar ratio of the SiH bond to the unsaturated bond in the component (A) ranges from 0.1 to 10, $$HSiR^2_a O_{(4-a)/2} \qquad (2)$$

wherein $R^2$ is a monovalent organic group and a is the number larger than 0 and less than 4, and
(C) an addition reaction catalyst in a catalytic amount.

3 Claims, 4 Drawing Sheets

CURABLE SILICONE COMPOSITION

CROSS REFERENCE

This application claims benefits of the Japanese Patent Application No. 2005-266077 filed on Sep. 13, 2005, contents of which are incorporated by reference.

FIELD OF THE INVENTION

The present invention relates to a curable composition, specifically a curable composition comprising a polycycloolefin-functional polysiloxane, an organohydrogensiloxane, and an addition reaction catalyst. The composition has characteristics of both polycycloolefin and polysiloxane, and is expected to be used for various applications such as additives, potting agent, and molding material.

BACKGROUND OF THE INVENTION

Recently, a cyclopolyolefin attracts attention because of its excellent optical transparency, heat resistance, mechanical strength and capability of forming a good film. Meanwhile, an organopolysiloxane is widely used as a functional polymer which is highly resistant to heat, moisture and chemicals. A polymer having both polycyclolefin backbone and polysiloxane backbones is therefore expected to have properties of the both backbones.

A cyclic functional polysiloxane can be a starting substance for preparing such a polymer. One example of the cyclic functional polysiloxane is known from WO02/062859 which describes norbornene functional polysiloxane represented by the formula shown below.

Japanese Patent Application Laid-Open No. 2003-252881 describes a silylnorbornene compound prepared by reacting a vinylsilane having an alkoxy group or a halogen group with cyclopentadiene.

Pierre M. Chevalier et al., "Ring-Opening Olefin Matathesis polymerisation (ROMP) as a Potential Cross-Linking Mechanism for Siloxane Polymers", Journal of Inorganic and Organometallic polymers (1999), 9(3), p 151, describes the followings.

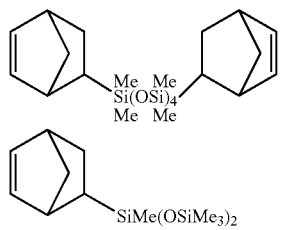

Macromolecules 1989, vol. 22, p 3205-3210, describes that the following norbornene functional tetrasiloxane is useful as an initiator for living ring-opening metathesis polymerization.

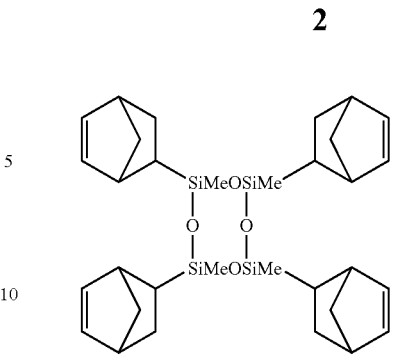

German Patent Application Publication No. DE4128932 describes that it is possible to incorporate a norbornene functional organopolysiloxane in a composition comprising an organopolysiloxane having an SiH bond and an addition reaction catalyst. However, no working example is given.

Addition-reaction polymerization is widely used, for example, for adhering or encapsulating electronic parts, and molding articles, because the reaction forms no by-product and can be progressed with extremely small amount of catalyst. However, it is known that an unsaturated bond which is not located at an end of a molecule has low reactivity and therefore not so practically useful for the polymerization. Further, reactivity of an unsaturated bond in a multi-cyclic compound has hardly been studied, in contrast to the fact that norbornene functional group has been studied much, for example, as described in J. Inorg. Organomet. Polym., Vol. 9, 3, p 151-164, 1999.

SUMMARY OF THE INVENTION

An object of the present invention is to provide a composition comprising a cycloolefin functional polysiloxane which gives a cured product having functionalities of both polycycloolefin and polysiloxane.

The present invention is a composition comprising
(A) polycycloolefin-functional polysiloxane represented by the following average compositional formula (1)

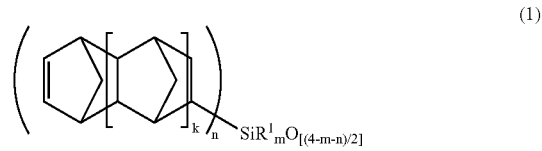

wherein $R^1$ is a monovalent organic group which does not have an unsaturated bond and may be different from each other, k is the number of 0 or larger, n is the number of from 0.01 to less than 4, m is the number of from 0 to less than 4, provided that the sum of m and n is larger than 0 and less than 4, (B) a siloxane having an SiH bond represented by the following average compositional formula (2) in such an amount that a molar ratio of the SiH bond to the unsaturated bond in the component (A) ranges from 0.1 to 10, $$HSiR^2{}_aO_{(4-a)/2} \quad (2)$$

wherein $R^2$ is a monovalent organic group and a is the number larger than 0 and less than 4, and (C) an addition reaction catalyst in a catalytic amount.

The aforesaid curable composition comprises both polysiloxane and polycycloolefin backbones to give a cured silicone which has a higher hardness and strength that cannot be attained by a pure silicone. The composition is expected to be used for various applications such as encapsulating material for optical devices and optical lenses.

BRIEF DESCRIPTIONS OF DRAWINGS

Figure 2:
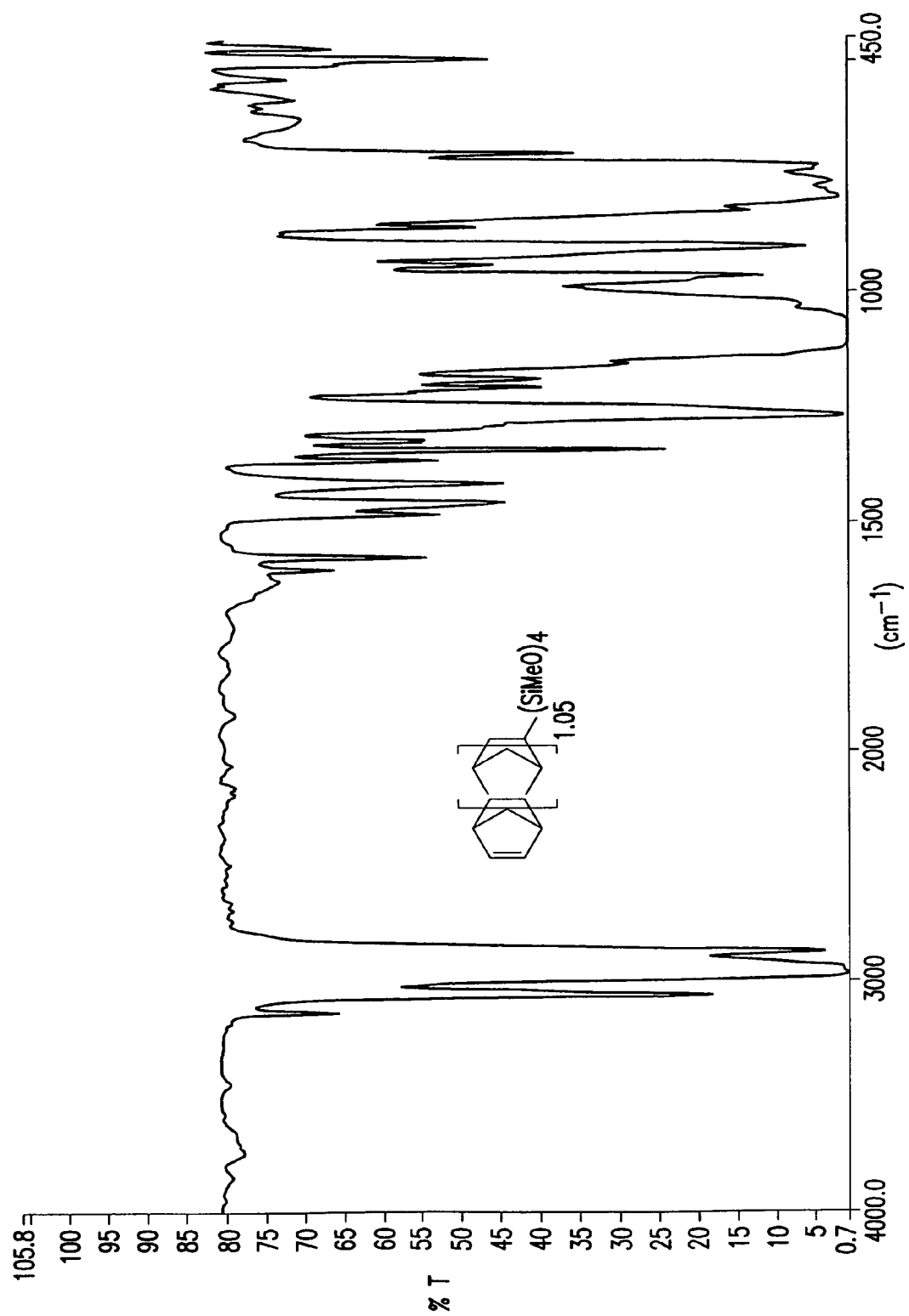
Figure 3:
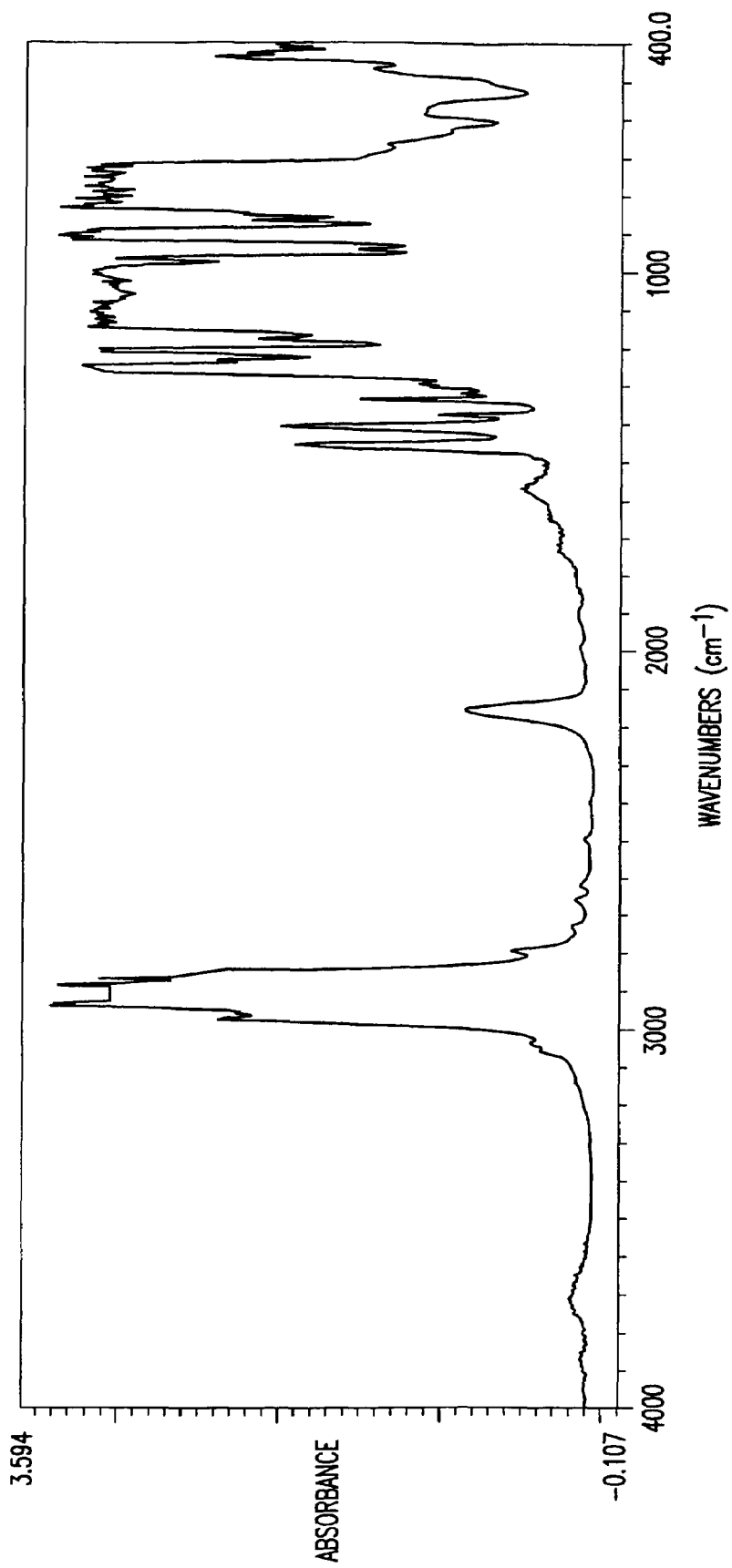
Figure 4:
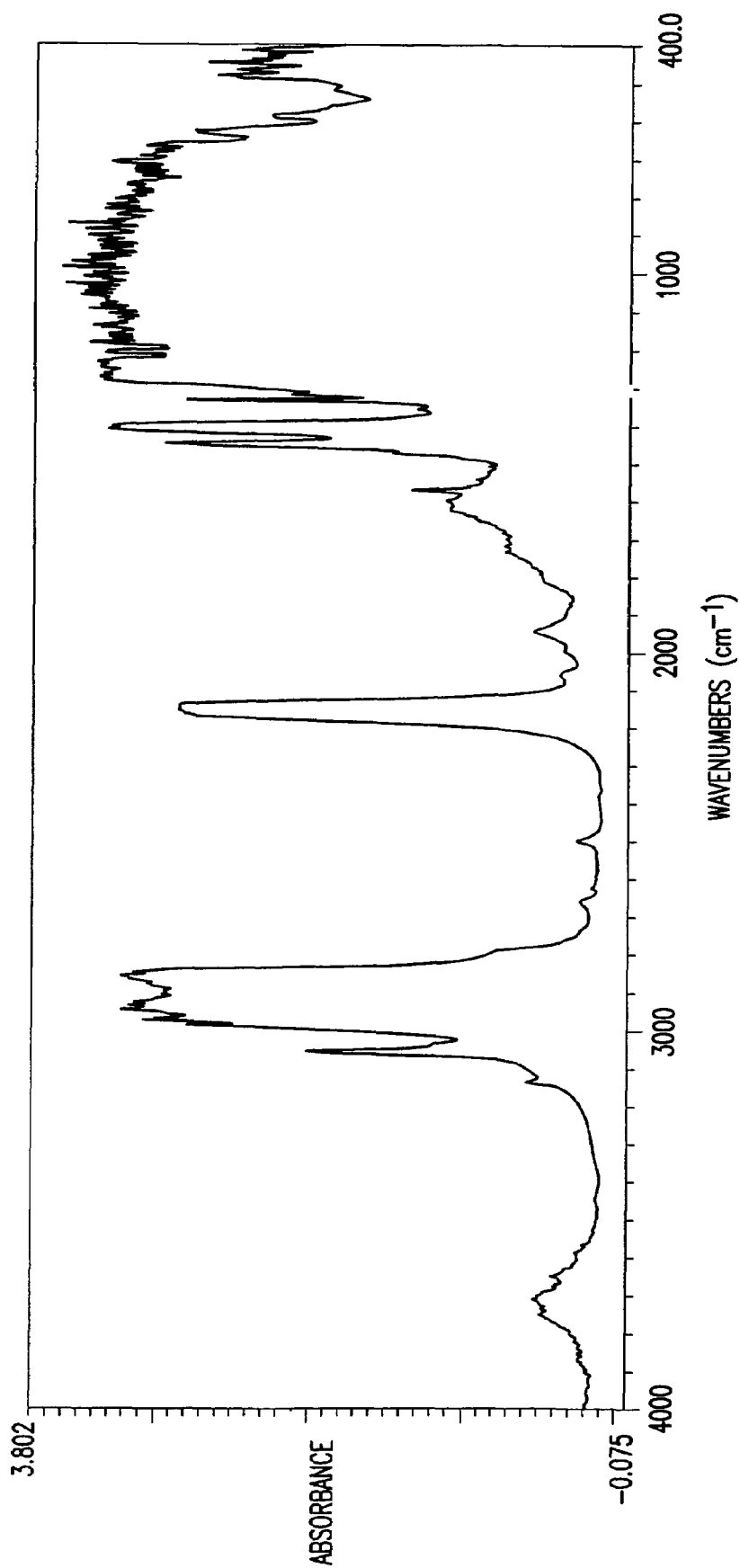

FIG. 1 shows an IR spectrum of the polysiloxane prepared in the preparation example 1;
FIG. 2 shows an IR spectrum of the polysiloxane prepared in the preparation example 2;
FIG. 3 shows an IR spectrum of the cure product prepared in the example 1; and
FIG. 4 shows an IR spectrum of the cure product prepared in the example 2.

DESCRIPTION OF THE PREFERRED EMBODIMENTS

The polycycloolefin-functional polysiloxane (A) may be a mixture of two or more chemical compounds and accordingly the formula (1) is an average compositional formula. For example, a polycycloolefin-functional polysiloxane of the formula (1) with k being 1.1 may be a mixture of 90 mole % of the compound with k being 1 and 10 mole % of the compound with k being 2 ($1.1=1\times0.9+2\times0.1$). A compositional analysis can be made by gas chromatography and elemental analysis as shown in the present Example. Preferred polycycloolefin-functional polysiloxane has k larger than 0, because such a polysiloxane has more than 2 rings.

In the formula (1), $R^1$ is a monovalent organic group which does not have an unsaturated group. When two or more $R^1$'s are present in a molecule, they may be different from each other. Preferably, $R^1$ is a monovalent hydrocarbon group having 1 to 10 carbon atoms. Examples of $R^1$ include alkyl groups such as methyl, ethyl, n-propyl, butyl, and pentyl groups; aryl groups such as phenyl, tolyl, and xylyl groups; and halogenated groups thereof such as fluorinated alkyl groups. Among these groups, methyl, phenyl, and trifluoropropyl groups are preferred.

Among the aforesaid polycycloolefin-functional polysiloxane, those with k being 0 can be prepared by the methods described in the aforesaid prior arts. Those with k being larger than 0 can be prepared by reacting a polysiloxane having an unsaturated group represented by the formula shown below with dicyclopentadiene at a temperature of from 100 to 250° C. and at atmospheric pressure, preferably under nitrogen flow.

$(CH_2=CH)_n SiR^1{}_m O_{[(4-m-n)/2]}$ wherein n is the number of from 0.01 to less than 4, m is the number of from 0 to less than 4, provided that the sum of m and n is larger than 0 and less than 4.

Examples of the polysiloxane having an unsaturated group are as shown below.

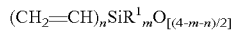

wherein A is —O—$(R^3R^1SiO)_p$—$(R^1{}_2SiO)_q$—$SiR^1{}_{3-b}R^3{}_b$, and

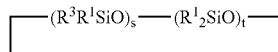

wherein $R^1$ is as defined above for the formula (1). $R^3$ is an unsaturated group; each a and b is 0 or 1, and each x, y, z, p and q is an integer of 0 or larger, provided that a is 1 when x, y and z are 0, and b is 1 when a, x, and p are 0. Preferably, x ranges from 0 to 50, y ranges form 0 to 100, z ranges from 0 to 20, p ranges from 0 to 50, q ranges from 0 to 100, x+y+z ranges from 0 to 100, and p+q ranges form 0 to 100. In the cyclic polysiloxane, s is an integer of 1 or larger, t is an integer of 0 or larger, and preferably s+t ranges from 3 to 8.

Examples of the preferred polysiloxane having an unsaturated group include $ViMe_2SiOSiMe_2Vi$, $ViMe_2SiOSiMe_2OSiMe_2Vi$, $ViMe_2Si(OSiMe_2)_{10}Vi$, $(ViMeSiO)_4$, $ViMe_2SiOSiViMeOSiMe_2Vi$, $ViMe_2Si(OSiMe_2)_{150}(OSiMeVi)_3OSiMe_2Vi$, $Me_3SiO(MeViSiO)_5(CF_3CH_2CH_2SiMeO)_{15}(Me_2SiO)_{15}SiMe_3$, wherein Me represents a methyl group and Vi represents a vinyl group.

Examples of the polycycloolefin-functional polysiloxane (A) include the following compounds, which may be used in a mixture of two or more of them.

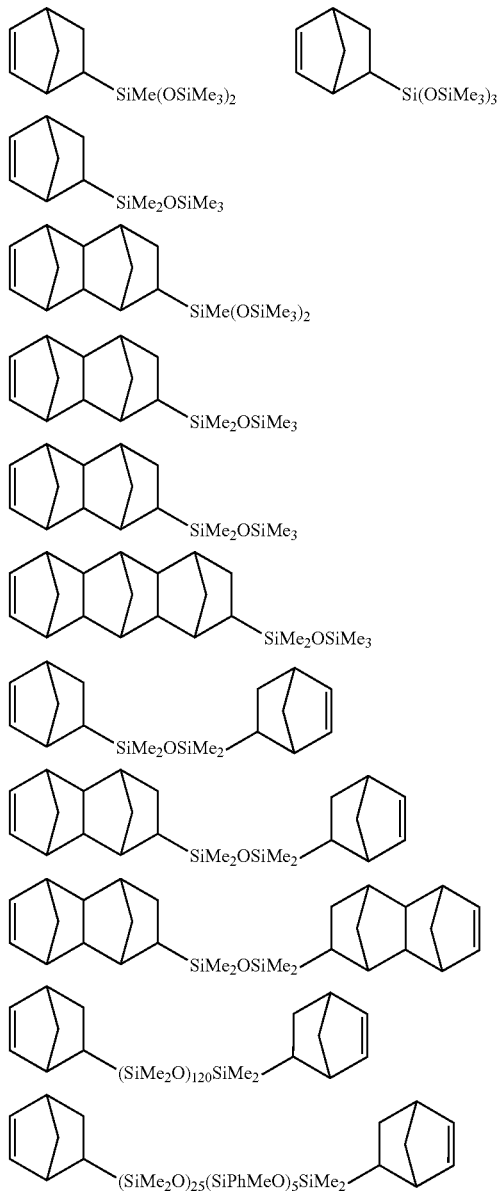

-continued

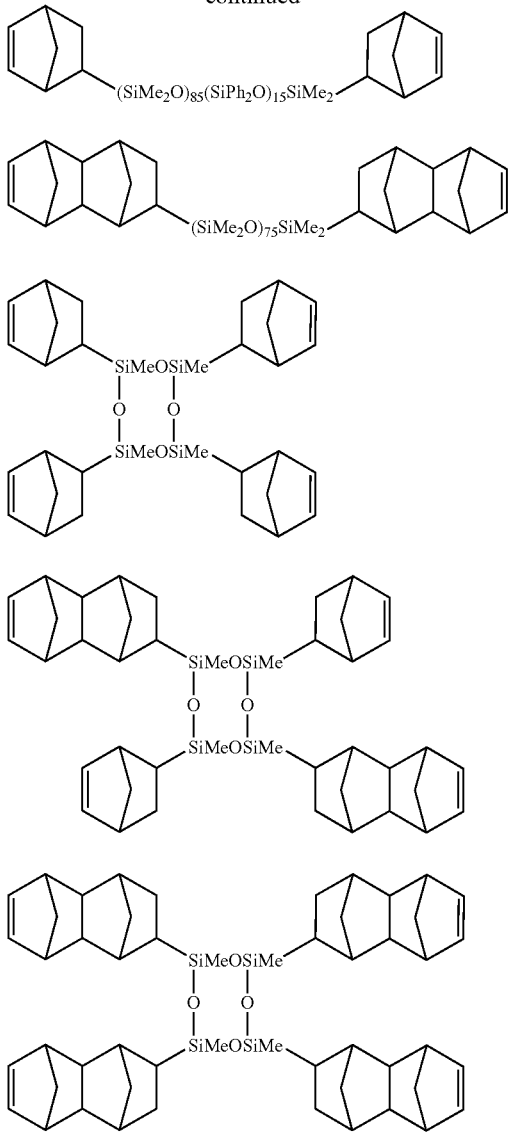

In the present composition, the siloxane having an SiH bond (B) is represented by the following average compositional formula (2).

$$HSiR^2_a O_{(4-a)/2} \quad (2)$$

wherein $R^2$ is a monovalent organic group. If there is a plurality of $R^2$ in a molecule, they may be different from each other. Preferably, $R^2$ is a monovalent hydrocarbon group having 1 to 10 carbon atoms which may be substituted. Examples of $R^2$ include alkyl groups such as methyl, ethyl, n-propyl, butyl, and pentyl groups; aryl groups such as phenyl, tolyl, and xylyl groups; and halogenated groups thereof. Among these groups, methyl, phenyl, and trifluoropropyl groups are preferred. In the formula (2), "a" is the number of larger than 0 and less than 4.

Examples of the siloxane include the followings.

$$H_a R^2_{3-a}SiO\!-\!(HR^2SiO)_x\!-\!(R^2_2SiO)_y\!-\!(R^2ASiO)_z\!-\!SiR^2_{3-a}H_a$$

wherein A is $-\!O\!-\!(HR^2SiO)_p\!-\!(R^2_2SiO)_q\!-\!SiR^2_{3-b}H_b$, and $$\boxed{-(HR^2SiO)_s\!-\!(R^2_2SiO)_t-}$$

In the above formula, $R^2$, a, b, x, y, z, p, and q are as defined above. Preferred siloxanes are as shown below, wherein Me represents a methyl group and Φ represents a phenyl group.

Me$_3$SiO[HSiMeO]$_{15}$SiMe$_3$,
Me$_3$SiO[HSiMeO]$_3$[Me$_2$SiO]$_{20}$SiMe$_3$,
HSiMe$_2$O[HSiMeO]$_2$Me$_2$SiH,
HSiMe$_2$O[HSiMeO]$_3$[Me$_2$SiO]$_{10}$Me$_2$SiH,
HSiMe$_2$O[HSiMeO]$_2$[Me$_2$SiO]$_2$[Φ$_2$SiO]$_5$Me$_2$SiH,
[HSiMeO]$_4$.

Component (B) is contained in the composition in such an amount that a molar ratio of SiH bonds in the component (B) to unsaturated groups in the component (A) ranges from 0.1 to 10, preferably from 0.5 to 2. A composition with the ratio below the aforesaid lower limit may not be cured enough, and a composition with the ratio above the aforesaid upper limit may give a cured product which has unsatisfactory physical properties, for example, low hardness and strength. The aforesaid molar ratio may typically be 1 to 200 parts by weight, preferably from 4 to 100 parts by weight, per 100 parts by weight of the component (A), though these amounts may be varied depending on molecular weight of the component (A) and component (B).

Examples of the addition reaction catalyst (C) include group VIII elements of the periodic table and compounds thereof among which platinum and platinum compounds are preferred, for example, chloroplatinic acid, a reaction product of platinum with alcohol, platinum complexes with olefins such as ethylene or vinylsiloxane, and metal platinum with silica, alumina, or carbon deposited thereon. Platinum group metal catalyst other than platinum, for example, rhodium, ruthenium, iridium, and palladium, can be used. Examples of compounds of such metals include RhCl(PPh$_3$)$_3$, RhCl(CO)(PPh$_3$)$_2$, Ru$_3$(CO)$_{12}$, IrCl(CO)(PPh$_3$)$_2$, and Pd(PPh$_3$)$_4$.

The content of the addition reaction catalyst (C) may be a catalytic amount. Typically, the catalyst is incorporated in an amount of from 0.001 to 10 parts by weight, more typically 0.01 to 5 parts by weight, per total 100 parts by weight of the components (A) and (B). If it is contained in an amount less than the catalytic amount, a curing speed will be too late to be practical. Too much catalyst (C) will make curing speed too high to control, which may cause problem.

In addition to the aforesaid components (A), (B), and (C), the present composition may contain various kinds of fillers to improve mechanical strength of its cured product. Examples of the fillers include fumed silica, precipitated silica, pulverized silica, calcium carbonate, diatomaceous earth, plastic spherical filler, silicone powder, carbon black, metals, and metal oxides, which may be surface treated.

The present curable composition may contain various kinds of additives in an amount not to adversely affect the composition. An example of such an optional additive is hydrosilylation catalyst retarder. Examples of the retarder include acetylene alcohol such as 1-ethynyl-1-1-hydroxycyclohexane, 3-methyl-1-butyene-3-ol, 3,5-dimethyl-1-hexyene-3-ol, 3-methyl-1-pentent-3-ol, phenylbutenol; 3-methy-1-3-pentene-1-yn, 3,5-dimethyl-3-hexyene-1-yn; polymethylvinyl siloxane cyclic compounds, and organic phosphorous compounds. The retarder controls speed of hydrosilylation reaction to enable one to improve storage stability of the compound.

The present composition can be prepared by mixing the aforesaid components (A), (B), (C), and optional components as desired at room temperature. Any known method of mixing may be used. To make a molded article from the composition, components (A) and (C) are mixed thoroughly first by a Shinagawa mixer, for instance. Immediately before molding, component (B) is thoroughly mixed with the mixture of components (A) and (C) and the mixture obtained is cast in a mold which is then heated in a oven, or is molded using a press molding machine provided with heating facility.

The present invention also relates to a resin obtained by curing the aforesaid composition. The resin comprises the following repeating unit represented by the formula (3) and the repeating unit represented by the formula (4).

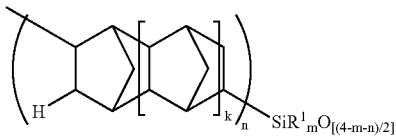

(3)

wherein $R^1$ is a monovalent organic group which does not have an unsaturated group and may be different from each other, k is the number of 0 or larger, n is the number of from 0.01 to less than 4, m is the number of from 0 to less than 4, provided that the sum of m and n is larger than 0 and less than 4;

(4)

wherein $R^2$ is a monovalent organic group, and a is the number larger than 0 and less than 4. Preferably, k is larger than 0.

The curable composition of the present invention has a polysiloxane backbone and cycloolefin backbone to give a cured product which has high hardness, high strength and flexibility. The composition is expected to be used not only for conventional applications of silicone materials but also for other applications, for example, encapsulation of optical elements such as LED and electronic parts, and preparation of optical lenses.

EXAMPLES

The present invention will be explained further with reference to the following examples, but not limited to them. In the following, Me represents a methyl group and φ represents a phenyl group.

Preparation Example 1

In a 200 ml-reactor, 76.3 g (0.58 mole) of dicyclopentadiene and 100 g of methylvinylcyclotetrasiloxane (vinyl value: 0.29 mole/100 g) were placed and subjected to a reaction under nitrogen flow at a temperature of from 160° C. to 175° C. for 6 hours. After volatile substances were removed at a temperature of 140° C. and a pressure of 5 mm Hg, 160 g of light yellow liquid which was viscous at room temperature was obtained. The liquid had a refractive index, $n_D^{25}$, of 1.501. The liquid was analyzed with a FT-IR spectrometer, Spectrum One, ex PerkinElmer, to give the spectrum shown in FIG. 1, and quantitatively analyzed with a gas chromatograph, GC-14B, ex Shimadzu Corp. The liquid was found to be expressed by the following average compositional formula, which is hereinafter referred to as polysiloxane A1. A yeild of the reaction was 91%.

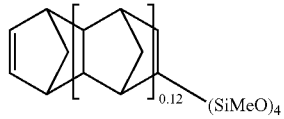

Preparation Example 2

In a 500 ml-reactor, 153 g (1.15 mole) of dicyclopentadiene and 100 g of methylvinylcyclotetrasiloxane (vinyl value: 1.16 mole/100 g) were placed and subjected to a reaction under nitrogen flow at a temperature of 160° C. to 175° C. for 6 hours. After volatile substances were removed at a temperature of 140° C. and a pressure of 5 mm Hg, 240 g of light yellow liquid which was viscous at room temperature was obtained. The liquid had a refractive index, $n_D^{25}$, of 1.5230. In the same manner as in Preparation Example 1 above, the liquid was analyzed by FT-IR, to give the spectrum shown in FIG. 2, and quantitatively analyzed by gas chromatography. The liqud was found to be expressed by the following average compositional formula, which is hearinafter referred to as polysiloxane A2.

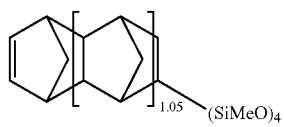

Preparation Example 3

In a 500 ml-reactor, 141 g (1.07 mole) of dicyclopentadiene and 100 g of 1,3-divinyltetramethyldisiloxane (0.54 mole) were placed and subjected to a reaction under nitrogen flow at a temperature of 160° C. to 175° C. for 6 hours. After volatile substances were removed at a temperature of 140° C. and a pressure of 5 mm Hg, 230 g of light yellow liquid which was viscous at room temperature was obtained. The liquid had a refractive index, $n_D^{25}$, of 1.515. As in Preparation Example 1 above, the liquid was analyzed by FT-IR and quantitatively analyzed by gas chromatography. The liqud was found to be expressed by the following average compositional formula, which is hearinafter referred to as polysiloxane A3.

Example 1

In a reactor, 100 parts by weight of the polysiloxane A1 prepared in Preparation Example 1, 118 parts by weight of siloxane expressed with the average compositional formula, $(Me_3SiO)_{0.3}(HSiMe_2O)_{1.7}(HSiMeO)_{4.5}(Me_2SiO)_{10.5}$, and 0.5 parts by weight of 2% chloroplatinic acid solution in butanol were mixed and heated at a temperature of 120° C. for 10 minutes. A cured product was obtained which was transparent light yellow and flexible. The cured product showed IR spectrum shown in FIG. 3 and had a Shore-D hardness according to ISO 868 of 25.

Example 2

In a reactor, 100 parts by weight of the polysiloxane A1 prepared in Preparation Example 1, 87 parts by weight of siloxane expressed with the average compositional formula, $HSiMe_2O(HSiMeO)_2(\Phi_2SiO)_2Me_2SiH$, and 0.5 parts by weight of 2% chloroplatinic acid solution in butanol were mixed and heated at a temperature of 120° C. for 10 minutes. A transparent light yellow cured product was obtained. The cured product showed IR spectrum shown in FIG. 4 and had a Shore-D hardness of 71. It had a modulus of elasticity measured according to JIS-K-6911 of 1515 ($N/mm^2$) and a bending strength of 35 ($N/mm^2$).

Example 3

In a reactor, 100 parts by weight of the polysiloxane A2 prepared in Preparation Example 2, 61 parts by weight of siloxane expressed with the average compositional formula, $HSiMe_2O(HSiMeO)_2(\Phi_2SiO)_2Me_2SiH$, and 0.5 parts by weight of 2% chloroplatinic acid solution in butanol were mixed and heated at a temperature of 120° C. for 10 minutes. A transparent light yellow cured product was obtained. The cured product had a Shore-D hardness of 75. It had a modulus of elasticity of 1915 ($N/mm^2$) and a bending strength of 49 ($N/mm^2$), both measured in the same manner as in Example 2.

Example 4

In a reactor, 100 parts by weight of the polysiloxane A3 prepared in Preparation Example 3, 80 parts by weight of siloxane expressed with the average compositional formula, $(Me_3SiO)_{0.3}(HSiMe_2O)_{1.7}(HSiMeO)_{4.5}(Me_2SiO)_{10.5}$, and 0.5 parts by weight of 2% chloroplatinic acid solution in butanol were mixed and heated at a temperature of 120° C. for 10 minutes. A transparent light yellow cured product which was flexible was obtained. The cured product had a Shore-A hardness of 55.

Example 5

In a reactor, 100 parts by weight of the polysiloxane A3 prepared in Preparation Example 3, 59 parts by weight of siloxane expressed with the average compositional formula, $HSiMe_2O(HSiMeO)_2(\Phi_2SiO)_2Me_2SiH$, and 0.5 parts by weight of 2% chloroplatinic acid solution in butanol were mixed and heated at a temperature of 120° C. for 10 minutes. A transparent light yellow cured product was obtained. The cured product had a Shore-A hardness of 80.

Comparative Example 1

In a reactor, 100 parts by weight of methylvinyltetrasiloxane used as a starting material in Preparetion Example 1, in place of the polysiloxane A1 prepared in Preparation Example 1, 154 parts by weight of siloxane expressed with the average compositional formula, $HSiMe_2O(HSiMeO)_2(\Phi_2SiO)_2Me_2SiH$, and 0.5 parts by weight of 2% chloroplatinic acid solution in butanol were mixed and heated at a temperature of 120° C. for 10 minutes. A transparent colorless cured product was obtained. The cured product had a Shore-A hardness of 55. It was brittle and broken easily by hand.

The invention claimed is:

1. A composition comprising
   (A) polycycloolefin-functional polysiloxane represented by the following average compositional formula (1)

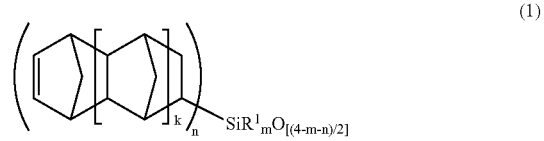
(1)

wherein $R^1$ is a monovalent organic group which does not have an unsaturated bond and may be different from each other, k is a number larger than of 0, n is a number of from 0.01 to less than 4, m is a number of from 0 to less than 4, provided that the sum of m and n is larger than 0 to 4, (B) a siloxane having an SiH bond, represented by the following average compositional formula (2) in such an amount that a molar ratio of the SiH bond to the unsaturated bond in the component (A) ranges from 0.1 to 10,

(2)

wherein $R^2$ is a monovalent organic group and a is a number larger than 0 and less than 4, and
   (C) an addition reaction catalyst in a catalytic amount.

2. The composition according to claim 1, wherein the molar ratio of the SiH bond in the component (B) to the unsaturated group in the component (A) ranges from 0.5 to 2.

3. A resin comprising the following repeating unit represented by the formula (3) and the repeating unit(4),

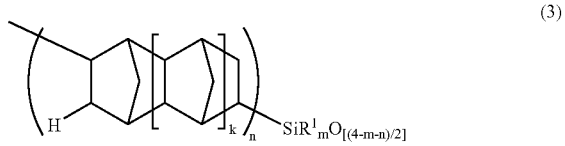
(3)

wherein $R^1$ is a monovalent organic group which does not have an unsaturated group and may be different from each other, k is the number of 0, n is a number of from 0.01 to less than 4, m is a number of from 0 to less than 4, provided that the sum of m and n is larger than 0 and less than 4;

(4)

wherein $R^2$ is a monovalent organic group, and a is a number larger than 0 and less than 4.

* * * * *